United States Patent [19]

Piper

[11] Patent Number: 4,897,067
[45] Date of Patent: Jan. 30, 1990

[54] DIAPHRAGH-TYPE GAME CALLER WITH REMOVABLE SPACER

[75] Inventor: Frank Piper, Delmont, Pa.

[73] Assignee: Penn's Woods Products, Inc., Delmont, Pa.

[21] Appl. No.: 300,918

[22] Filed: Jan. 24, 1989

[51] Int. Cl.⁴ .......................... A63H 5/00; A63H 3/31
[52] U.S. Cl. .................... 446/207; 446/416; 446/188; 43/1
[58] Field of Search ............... 446/202, 203, 204, 205, 446/206, 207, 208, 209, 213, 188, 176, 297, 415, 416; 43/1, 2

[56] References Cited

U.S. PATENT DOCUMENTS

| | | | |
|---|---|---|---|
| 2,385,752 | 9/1945 | Wilson | 446/209 |
| 2,488,838 | 11/1949 | Tierce | 446/208 |
| 3,583,094 | 6/1971 | Tribell | 446/202 |
| 4,341,037 | 7/1982 | Moss | 446/204 |
| 4,483,097 | 11/1984 | Piper | 446/207 |
| 4,614,503 | 9/1986 | Skoda | 446/176 X |
| 4,752,270 | 6/1988 | Morton | 446/207 |
| 4,764,145 | 8/1988 | Kirby | 446/208 |
| 4,799,913 | 1/1989 | Wolfe | 446/203 X |

*Primary Examiner*—Mickey Yu
*Assistant Examiner*—D. Neal Muir
*Attorney, Agent, or Firm*—Dann, Dorfman, Herrell and Skillman

[57] ABSTRACT

The present invention provides a dual diaphragm-type game caller of a size and shape suitable for inserting into a user's mouth for support against the roof of the mouth so that free edges of two diaphragms retained together as a unit in a spaced-apart relationship can concurrently vibrate when impinged by pulmonary air exhausted by the user. The invention employs two diaphragms having a selected pattern of slits which allow the caller to produce a flutter or raspy sound effect which is sometimes desired by the wild turkey hunter. The present invention also provides a removable spacer of a size and shape suitable for insertion between the two diaphragms when the caller is not in use, such that the two diaphragms are kept completely separated, thereby preventing one from adhering to the other.

15 Claims, 1 Drawing Sheet

DIAPHRAGH-TYPE GAME CALLER WITH REMOVABLE SPACER

FIELD OF THE INVENTION

The present invention relates to a game caller having a size and shape suitable for insertion into a user's mouth for support against the roof of the mouth so that free edges of two diaphragms retained together as a unit in a spaced-apart relationship can concurrently vibrate when impinged by pulmonary air exhausted by the user. More particularly, the present invention relates to a dual diaphragm-type game caller having a removable spacer of a size and shape suitable for insertion between the two diaphragms when the caller is not in use, such that the two diaphragms are kept completely separated.

BACKGROUND OF THE INVENTION

Conventionally, a game caller having a pair of spaced-apart diaphragms has been used for insertion into a user's mouth to generate sounds of wild game, such as wild turkeys. Such a caller is typically constructed of a pair of diaphragms supported in a spaced-apart relationship by a bendable frame, usually made of aluminium, and held together by an outer sheet-like casing sheet. The caller is used by fitting it against the roof of the user's mouth where exhausted pulmonary air vibrates the diaphragms.

One of the problems with dual-diaphragm callers is that when the caller is not in use, its latex diaphragms have a tendency to adhere to each other after exposure to saliva and continued use, rendering the caller unusable. This problem is especially acute in game callers having slits or even a flap cut into one of the diaphragms. Typically, the flap or the slit portion of the diaphragm is under less tension than the remainder of the diaphragm and is therefore free to sag into contact with the other diaphragm when the caller is not in use. Hunters have tried to keep the diaphragms separated by a variety of improvised methods, for instance, by inserting toothpicks or paperclips between the diaphragms. However, such measures suffer from at least two drawbacks. First, the sharp points or edges of the makeshift inserts such as toothpicks tend to tear the rather delicate latex diaphragms, thereby damaging the caller. Second, inserts such as toothpicks are not properly dimensioned or configured to completely separate the two diaphragms at all possible points of contact, in which case the diaphragms tend to partially adhere to each other, thereby decreasing the efficacy of the caller or even rendering it unusable.

SUMMARY OF THE INVENTION

In accordance with the present invention a game caller is provided which is capable of producing complex tones comprised of multiple frequencies to simulate a great variety of sounds made by wild game, particularly turkey. The game caller employs two spaced-apart diaphragms which may have a selected pattern of slits which allow the caller to produce a flutter or raspy sound effect which is sometimes desired by the hunter. In accordance with the present invention, a removable spacer is provided which is capable of completely separating the two diaphragms, as well as any slit portions of said diaphragms when the caller is not in use.

Generally, the present invention provides a game caller having components of a size and shape suitable for insertion into a user's mouth for support against the roof of the mouth for impingement of the caller diaphragms with exhausted pulmonary air to simulate sounds normally made by wild game. The caller comprises a support and first and second generally flat diaphragms held by the support. The diaphragms are fixedly retained by the support in a spaced-apart relationship with one diaphragm generally overlying the other so that the diaphragms have spaced-apart, opposing surface areas free from the support. The pair of diaphragms may have slightly different surface areas, but each diaphragm presents an edge free to vibrate in order to permit the generation of a desired call. The vibratory edges may be positioned substantially parallel to each other with one edge slightly offset from the other. One diaphragm may have at least two slits generally perpendicular to its vibratory edge to provide a vibratory flap in the diaphragm and the other diaphragm may have at least one slit generally parallel to its vibratory edge to permit exhausted pulmonary air to pass through the slit to impinge upon said flap.

The game caller also includes a removable spacer removably insertable between the free edges of the diaphragms into position generally between the two diaphragms. To prevent tearing of the diaphragms upon insertion, the removable spacer has generally smooth exposed surfaces for insertion between the diaphragms. The spacer is also configured to completely retain the opposing surfaces of the diaphragms out of contact with one another when the removable spacer is inserted. The removable spacer has a size and shape suitable for keeping completely separate the opposing surfaces of the first and second diaphragms, thereby preventing the two diaphragms from adhering to each other. The spacer is insertable between the two diaphragms whenever the game caller is not in use, and is readily removable when the hunter wishes to use the game caller.

BRIEF DESCRIPTION OF THE DRAWINGS

The foregoing summary and the following detailed description of the invention will be better understood when read in conjunction with the accompanying drawings, in which.

DETAILED DESCRIPTION OF THE INVENTION

Figure 1:
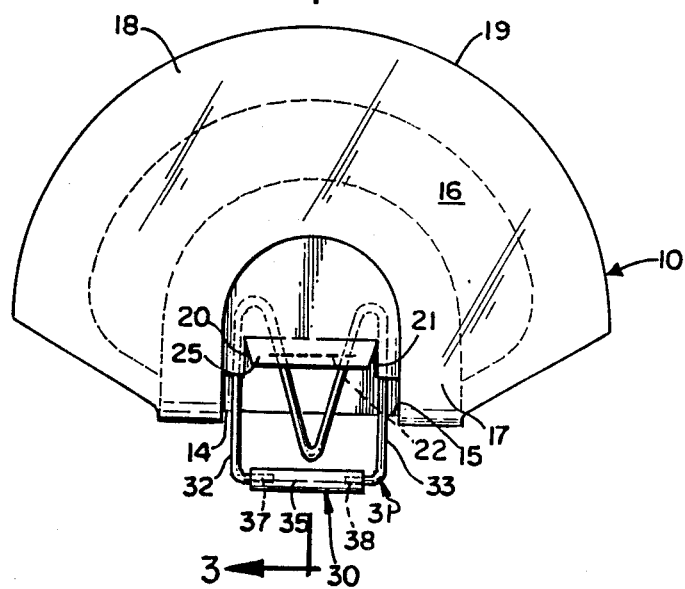
FIG. 1 is a plan view of the game caller.

Referring to the drawings, the present invention provides a game caller, generally designated 10, with a removable spacer, generally designated 30. The caller 10 includes a support structure and a pair of diaphragms 11 and 12 having a size and shape suitable for support against the roof of a user's mouth for impingement with exhausted pulmonary air to simulate sounds normally made by wild game.

Figure 2:
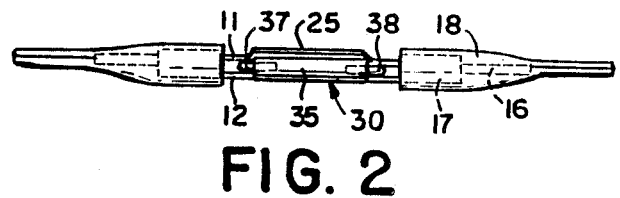
FIG. 2 is a front elevational view of the game caller.

The support structure holds and supports the first and second generally flat, sheet-like diaphragms 11 and 12. The diaphragms are fixedly retained by the support structure in tension with surface areas of the diaphragms exposed from the support. The diaphragms are held by the support structure in a generally parallel spaced-apart relationship with one diaphragm 11 generally overlying the other diaphragm 12 on the support structure so that the diaphragms have generally opposing, spaced-apart surface areas free from the support structure. Each diaphragm 11 and 12 has a different surface area exposed from the support structure and each diaphragm 11 and 12 presents an edge 14 and 15, respectively, free of the support structure to vibrate from the exhausted pulmonary air. As shown in FIG. 2, the respective vibratory edges 14 and 15 may be disposed in a generally parallel relationship to each other, but with one edge 14 being generally offset from the generally parallel edge 15 of the other diaphragm in direction normal to the parallel edges along a reference plane generally parallel to the diaphragms. As shown in the drawings, the first diaphragm 11 may have at least two slits 20 and 21 generally perpendicular to its vibratory edge 14 to provide a flap 25 on the diaphragm 11 and the second diaphragm 12 may have at least one slit 22 generally parallel to its vibratory edge 15.

The support structure of the game caller comprises a fixed spacer 16, a frame 17, and a fastener 18. The frame 17 is initially generally elliptical in shape with a centrally-disposed window. During assembly, the frame is bent in half to form first and second generally C-shaped frame half portions. The frame 17 is bent in half so that the C-shaped half portions of the frame generally align with each other.

The fixed spacer 16 is generally C-shaped so that it may be positioned between at least portions of the two diaphragms and then aligned and held in position between the bent C-shaped frame halves. As such, the fixed spacer is held by and supported in position by the frame between portions of the two diaphragms. The frame 17 is bent in half and compressed to hold the fixed spacer and the diaphragms in position. The fixed spacer, the frame, and the diaphragms are in turn held together in a fixed relationship by a fastener, preferably in the form of a generally pliable sheet-like casing 18.

The first and second diaphragms 11 and 12 are both made of latex or other suitable material. The diaphragms 11 and 12 preferably have generally straight vibratory edges 14 and 15, respectively. The diaphragms are placed on opposite sides of the approximately C-shaped fixed spacer 16 which is made of paper or other suitable material so that the diaphragms may be held by the frame 17 in the generally spaced-apart relationship by the C-shaped fixed spacer positioned therebetween.

The diaphragms 11 and 12 are stretched to a desired tension and are fixedly retained by the bent and compressed frame 17 in the spaced-apart relationship with one diaphragm generally overlying the other diaphragm. The diaphragms are held in tension between the bent-over half portions of the frame 17. The free edges 14 and 15 of the diaphragms are confined between the bends of the frame 17, as best shown in FIG. 2, with the C-shaped fixed spacer positioned in general alignment between the C-shaped half frame sections of the bent frame 17, as best shown in FIG. 1. The fixed spacer 16 is dimensioned to protrude from the side of the bent frame 17 distal to the vibratory edges 14 and 15 of the diaphragms. The frame 17 is typically made of aluminum, plastic or other suitable material that is capable of taking a permanent set when the frame is bent in half to hold the diaphragms and the fixed spacer together.

Figure 3:
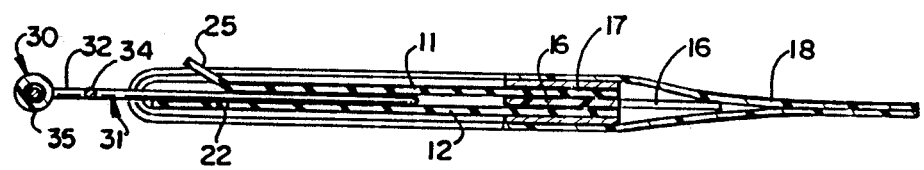
FIG. 3 is a cross-sectional view taken along line 3—3 in FIG. 1.

The fastener 18 which is used to hold the diaphragms 11 and 12, the fixed spacer 16, and the frame 17 together in a fixed relationship is preferably a thin, generally flat sheet-like plastic casing having a generally C-shaped configuration. The casing covers and adheres to the outer top and bottom surfaces of the bent frame and the top and bottom surfaces of the fixed spacer 16 projecting from the frame 17. The casing is preferably made of latex or adhesive tape sheets that are bonded together along the outer edge 19 of the casing, as shown in FIGS. 2 and 3.

Preferably, the first diaphragm 11 is shorter than the second diaphragm 12 so that the vibratory edge 14 of the first diaphragm 11 is generally parallel to, but offset from, the vibratory edge 15 of the second diaphragm 12. Also, the generally shorter first diaphragm 11 is preferably positionable during use proximate to the roof of the user's mouth.

As shown in FIGS. 1 and 2, the first diaphragm 11 has at least two slits 20 and 21, generally perpendicular to vibratory edge 14, and preferably approximately equidistant from the center of free edge 14. Each slit 20 and 21 originates at vibratory edge 14 to provide a central flap 25 on the first diaphragm 11. The flap 25 creates an area of reduced tension relative to the remaining portion of the diaphragm 11 so that the flap is free to flutter during use. Because of the reduced tension on the flap 25, there is a tendency for the flap 25 to sag into contact with the other diaphragm 12 when the caller is not in use. As shown in FIG. 1, the second diaphragm 12 has at least one slit 22 generally parallel to vibratory edge 15. As shown in FIG. 1, the slit 22 in diaphragm 12 is generally shorter in width than the width of flap 25. Preferably, the slit 22 is positioned so that when pulmonary air is exhausted through the slit 22, the air impinges on the first diaphragm 11 and particularly on the flap 25 to create a desired fluttering or raspy effect. For this purpose, the slit 22 is positioned generally beneath the flap 25. The slit 22, however, creates an area of reduced tension relative to the remaining portion of the second diaphragm 12. Once again, there is a resulting tendency for the reduced tension area of the second diaphragm 12 adjacent the slit 22 to sag into contact with the first diaphragm 11 when the caller is not in use.

In order to prevent portions of one diaphragm from contacting and adhering to the other diaphragm, a removable spacer, generally designated 30, is removably insertable between the free edges 14 and 15 of the first and second diaphragms 11 and 12 into position generally between the opposing inner surface areas of the diaphragms. The removable spacer 30 has generally smooth exposed surfaces on the portion of the spacer 30 inserted between the diaphragms to prevent tearing of the diaphragms upon insertion. The removable spacer is configured of a suitable size and shape to completely retain the opposing surfaces of the first and second diaphragms 11 and 12 out of contact with one another upon insertion of the removable spacer between the diaphragms. The portion of the spacer 30 inserted between the diaphragms is dimensioned with a selected thickness that generally approximates the space between the two diaphragms so that the removable spacer 30 fits between the two diaphragms upon insertion. Upon insertion, the removable spacer 30 contacts the opposing inner surfaces of both diaphragms and is held in position by the tension on the diaphragms. The removable spacer 30 has generally smooth exposed surfaces on the portion of the spacer 30 inserted between the diaphragms to prevent tearing of the diaphragms upon insertion. The removable spacer 30 is insertable between the diaphragms whenever the game caller is not in use, and is readily removable when the hunter wishes to use the game caller.

As shown in the drawings, the removable spacer 30 comprises a spacer body 31 formed from a wire and a handle 35 formed from a connecting tube. The generally symmetric spacer body 31 is made by forming at least three reverse bends in the middle section of a predetermined length of stainless steel wire having two ends, thereby creating two outlying legs 32 and 33, and a generally v-shaped section 34 lying in the same plane therebetween. As such, the spacer body is formed into a generally M-shaped configuration. The v-shaped section 34 keeps the middle areas of the two diaphragms of a dual diaphragm-type caller completely separated.

Each end of the spacer body 31 is bent to form inturned feet 37 and 38 which are generally perpendicular to, and coplanar with, legs 32 and 33 respectively. The feet are joined by the handle 35 which is formed from a predetermined length of plastic tubing having two ends. Each end of the tubing snugly fits over a respective one of the foot ends of the spacer body 31 thus creating a closed loop. The plastic tubing provides a convenient handle by which to insert and remove the spacer from the game caller. The removable spacer 30 is configured so that the handle 35 is positioned external to the diaphragms upon insertion of the spacer 30 between the diaphragms to facilitate removal of the spacer 30 from between the diaphragms by the user.

The removable spacer 30 is particularly effective when used in conjunction with a game caller 10 which has diaphragmatic slits 20 and 21 to provide a loose flap 25 of reduced tension area on the first diaphragm 11. After the caller is exposed to saliva, the removable spacer 30 is inserted between the diaphragms after use so that a portion of the v-shaped section 34 of the spacer 30 is positioned between the diaphragms, and preferably between the flap 25 and the second diaphragm 12 to prevent the flap 25 from contacting and adhering to the second diaphragm 12. Likewise, a portion of the v-shaped section 34 is positioned relative to the reduced tension area adjacent slit 22 on the second diaphragm 12 to prevent this reduced tension area from contacting or adhering to the first diaphragm.

While certain preferred embodiments of the present invention have been illustrated and described, the present invention is not limited thereto but may be variously modified or embodied within the scope of the following claims. For example, the removable spacer 30 may be constructed from different materials, such as wood or plastic, or formed into different configurations, such as a disk having an integral spacer body and handle. The spacer may be configured to completely fill the space between the opposing surfaces of the diaphragms.

What is claimed is:

1. A game caller having components of a size and shape suitable for insertion into a user's mouth for support against the roof of the mouth comprising:
   a support;
   first and second generally flat, sheet-like diaphragms fixedly retained by the support in tension with surfaces of the diaphragms exposed from the support and with the diaphragms in a generally spaced-apart relationship with respect to one another with one of the diaphragms generally overlying the other so that the diaphragms have spaced-apart opposing surface areas free from the support, each diaphragm presenting an edge free of the support to vibrate by exhausted pulmonary air when the support and the diaphragms are inserted within the user's mouth generally against the roof of the mouth; and
   a removable spacer insertable between the free edges of the diaphragms into position generally between the first and second diaphragms, the removable spacer having generally smooth exposed surfaces for insertion between the diaphragms to prevent tearing of the diaphragms and a configuration to completely retain the opposing surface areas of the first and second diaphragms out of contact with one another when the removable spacer is inserted between the diaphragms upon removal of the support and diaphragms from the mouth of the user.

2. The game caller as recited in claim 1 wherein the support comprises:
   a fixed spacer fixedly positioned between the first and second diaphragms for spacing apart the first and second diaphragms;
   a frame for holding the fixed spacer and the diaphragms in position on the frame with the fixed spacer generally between portions of the first and second diaphragms; and
   a fastener to hold the fixed spacer, the frame, and the diaphragms together in a fixed relationship.

3. The game caller as recited in claim 1 wherein at least one of the first and second diaphragms includes an area having reduced tension relative to the tension on a remaining portion of such diaphragm causing the reduced tension area of such diaphragm to sag toward the other diaphragm and wherein said removable spacer is configured to retain the reduced tension area out of contact with the other diaphragm when the removable spacer is inserted between the first and second diaphragms when the support and the first and second diaphragms are removed from the mouth of the user.

4. The game caller as recited in claim 1 wherein each of the first and second diaphragms includes an area having reduced tension relative to the tension on a remaining portion of each such diaphragm causing the reduced tension area of each such diaphragm to sag toward the other diaphragm and wherein said removable spacer is configured to retain the reduced tension area of each diaphragm out of contact with the other diaphragm when the removable spacer is inserted between the first and second diaphragms when the support and the first and second diaphragms are removed from the mouth of the user.

5. The game caller as recited in claim 1 wherein at least one of the first and second diaphragms includes a slit providing an area having reduced tension relative to the tension on a remaining portion of such diaphragm causing the reduced tension area of such diaphragm to sag toward the other diaphragm and wherein said removable spacer is configured to retain the reduced tension area out of contact with the other diaphragm when the removable spacer is inserted between the first and second diaphragms when the support and the first and second diaphragms are removed from the mouth of the user after use.

6. The game caller as recited in claim 1 wherein each of the first and second diaphragms includes a slit providing an area having reduced tension relative to the tension on a remaining portion of each such diaphragm causing the reduced tension area of each such diaphragm to sag toward the other diaphragm and wherein said removable spacer is configured to retain the reduced tension area of each diaphragm out of contact with the other diaphragm when the removable spacer is inserted between the first and second diaphragms when the support and the first and second diaphragms are removed from the mouth of the user after use.

7. The game caller as recited in claim 1 wherein one of the first and second diaphragms includes a flap having reduced tension relative to the tension on a remaining portion of such diaphragm causing the flap of such diaphragm to sag toward the other diaphragm and wherein said removable spacer is configured to retain the flap out of contact with the other diaphragm when the removable spacer is inserted between the first and second diaphragms when the support and the first and second diaphragms are removed from the mouth of the user after use.

8. The game caller as recited in claim 7 wherein the removable spacer is configured so that a portion of the removable spacer is positionable between the flap and the other diaphragm.

9. The game caller as recited in claim 8 wherein the first diaphragm includes said flap and said second diaphragm includes a slit providing an area having reduced tension relative to the tension on a remaining portion of the second diaphragm causing the reduced tension area of the second diaphragm to sag toward the first diaphragm and wherein said removable spacer is configured to retain the area of reduced tension of the second diaphragm out of contact with the first diaphragm when the removable spacer is inserted between the first and second diaphragms when the support and the first and second diaphragms are removed from the mouth of the user after use.

10. The game caller as recited in claim 1 wherein the removable spacer comprises a spacer body generally insertable between the first and second diaphragms; and
a handle external to the diaphragms coupled with the spacer body to facilitate removal of the removable spacer from between the diaphragms.

11. The game caller as recited in claim 10 wherein the spacer body is formed into a selected configuration from a predetermined length of wire having two ends, and wherein each end of the wire is coupled with the handle.

12. The game caller as recited in claim 11 wherein the handle is formed from a predetermined length of tubing having two ends, each end of said tubing snugly fitting over one of the respective ends of the wire.

13. The game caller as recited in claim 11 wherein said selected configuration of said wire is generally M-shaped.

14. The game caller as recited in claim 10 wherein the spacer body is dimensioned with a selected thickness so that the spacer body contacts the opposing surfaces of both diaphragms and is held in inserted position by the tension on the diaphragms.

15. A game caller having components of a size and shape suitable for insertion into a user's mouth for support against the roof of the mouth comprising:
a support;
first and second generally flat diaphragms fixedly retained by the support in a generally spaced-apart relationship with respect to one another with one of the diaphragms generally overlying the other so that the diaphragms have spaced-apart opposing surface areas free from the support, each diaphragm presenting an edge free of the support to vibrate by exhausted pulmonary air, said vibratory edges being oriented in a generally parallel relationship to each other, the first diaphragm having at least two slits generally perpendicular to the vibratory edge of said first diaphragm to provide a flap on the first diaphragm and the second diaphragm having at least one slit generally parallel to the vibratory edge of said second diaphragm; and
a removable spacer insertable between the free edges of the diaphragms into position generally between the first and second diaphragms, the removable spacer having generally smooth exposed surfaces for insertion between the diaphragms to prevent tearing of the diaphragms upon insertion and a configuration to completely retain the opposing surface areas of the first and second diaphragms out of contact with one another when the removable spacer is inserted between the diaphragms upon removal of the support and diaphragms from the user's mouth.

* * * * *